(12) United States Patent
Volnhals

(10) Patent No.: US 7,446,692 B2
(45) Date of Patent: Nov. 4, 2008

(54) DIGITAL RADIO SYSTEM AND METHOD OF OPERATION

(75) Inventor: Stefan Volnhals, Adelschlag (DE)

(73) Assignee: Microtune (Texas), L.P., Plano, TX (US)

( * ) Notice: Subject to any disclaimer, the term of this patent is extended or adjusted under 35 U.S.C. 154(b) by 0 days.

(21) Appl. No.: 11/693,876

(22) Filed: Mar. 30, 2007

(65) Prior Publication Data

US 2008/0238751 A1 Oct. 2, 2008

(51) Int. Cl.
*H03M 1/12* (2006.01)
(52) U.S. Cl. .............................. 341/155; 341/61
(58) Field of Classification Search ................ 341/155, 341/141, 122, 123, 61
See application file for complete search history.

(56) References Cited

U.S. PATENT DOCUMENTS

| | | | |
|---|---|---|---|
| 5,619,536 A * | 4/1997 | Gourgue | 375/316 |
| 6,553,215 B1 | 4/2003 | Chung | 455/218 |
| 6,714,608 B1 | 3/2004 | Samueli et al. | 375/344 |
| 6,922,555 B1 * | 7/2005 | Mohindra | 455/314 |
| 7,010,443 B2 * | 3/2006 | Torin et al. | 702/69 |
| 2006/0003728 A1 | 1/2006 | Tuttle et al. | 455/333 |
| 2006/0262741 A1 * | 11/2006 | Niemela | 370/319 |

OTHER PUBLICATIONS

*Notification of Transmittal of the International Search Report and the Written Opinion of the International Searching Authority* for International Application No. PCT/US2008/058170; 13 pages.

* cited by examiner

*Primary Examiner*—Peguy JeanPierre
(74) *Attorney, Agent, or Firm*—Baker Botts L.L.P.

(57) ABSTRACT

A digital radio system comprises a mixer and an analog-to-digital converter communicative coupled to the mixer. The mixer generates an intermediate frequency signal based at least in part upon a radio frequency signal and a local oscillator signal, wherein the intermediate frequency signal comprises a signal of interest having a particular bandwidth. The analog-to-digital converter generates a digital signal by quantizing the intermediate frequency signal using a sampling frequency that is greater than twice the bandwidth of the signal of interest and less than the frequency of the intermediate frequency signal.

42 Claims, 3 Drawing Sheets

| PARAMETER | 10.7 MHz IF | 48 kHz AUDIO SAMPLE RATE | 44.1 kHz AUDIO SAMPLE RATE |
|---|---|---|---|
| $f_{IF}$ | 10.7 MHz | 12.0 MHz | 11.025 MHz |
| $f_S$ | 1.712 MHz | 1.920 MHz | 1.764 MHz |
| $f_{digital}$ | .428 MHz | .480 MHz | .441 MHz |

DIGITAL RADIO SYSTEM AND METHOD OF OPERATION

TECHNICAL FIELD OF THE INVENTION

This invention relates in general to signal processing, and more particularly to a digital radio system.

BACKGROUND OF THE INVENTION

Current AM/FM radio tuners perform a series of frequency conversions from the radio frequency signal to a first intermediate frequency signal and then to a second intermediate frequency signal. The second intermediate frequency signal is then sampled and digitized at a high rate using an oversampling approach. The digital signal is then filtered and converted to a baseband frequency using hardware based filters and digital mixers. However, "off the shelf" digital signal processing circuitry cannot be used to perform the baseband conversion because it is unable to handle the high data rate of the digital signal resulting from the oversampling of the second intermediate frequency.

SUMMARY OF THE INVENTION

In accordance with the present invention, the disadvantages and problems associated with prior digital radio systems have been substantially reduced or eliminated.

In accordance with one embodiment of the present invention, a digital radio system comprises a mixer and an analog-to-digital converter communicatively coupled to the mixer. The mixer generates an intermediate frequency signal based at least in part upon a radio frequency signal and a local oscillator signal, wherein the intermediate frequency signal comprises a signal of interest having a particular bandwidth. The analog-to-digital converter generates a digital signal by quantizing the intermediate frequency signal using a sampling frequency that is greater than twice the bandwidth of the signal of interest and less than the frequency of the intermediate frequency signal.

Another embodiment of the present invention is a method for tuning a frequency signal. The method starts by generating an intermediate frequency signal based at least in part upon a radio frequency signal and a local oscillator signal, wherein the intermediate frequency signal comprises a signal of interest having a particular bandwidth. The method concludes by generating a digital signal by quantizing the intermediate frequency signal using a sampling frequency that is greater than twice the bandwidth of the signal of interest and less than the frequency of the intermediate frequency signal.

The following technical advantages may be achieved by some, none, or all of the embodiments of the present invention. Particular technical advantages of the present invention are achieved because the tuner of the digital radio system adopts a particular sampling approach when digitizing the intermediate frequency signal. In particular, the analog-to-digital converter quantizes the intermediate frequency signal using a sampling frequency that is greater than twice the bandwidth of the signal of interest and less than the frequency of the intermediate frequency signal. A result, in one embodiment, is that the frequency of the digital signal is one quarter of the sampling frequency. In this regard, the sampling frequency is selected in such a way that the subsequent baseband conversion can be realized without complex frequency mixing. In particular, the baseband conversion can be achieved with simple multiplication (e.g., for I: 1, −1, −1, and 1; and for Q: 1, 1, −1, −1; or, alternatively, for I: 1, 0, −1, and 0; and for Q: 0, 1, 0, and −1), thereby reducing the computing power necessary in the digital signal processing (DSP) circuitry. Furthermore, in one embodiment, the data rate is an integer multiple of standard audio sample rates like 48 kHz or 44.1 kHz, which reduces the necessary computing power even further. This results in power savings in the DSP and enables implementation of an AM/FM/WX radio using an "off the shelf" DSP.

These and other advantages, features, and objects of the present invention will be more readily understood in view of the following detailed description, drawings, and claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figures 1, 3:
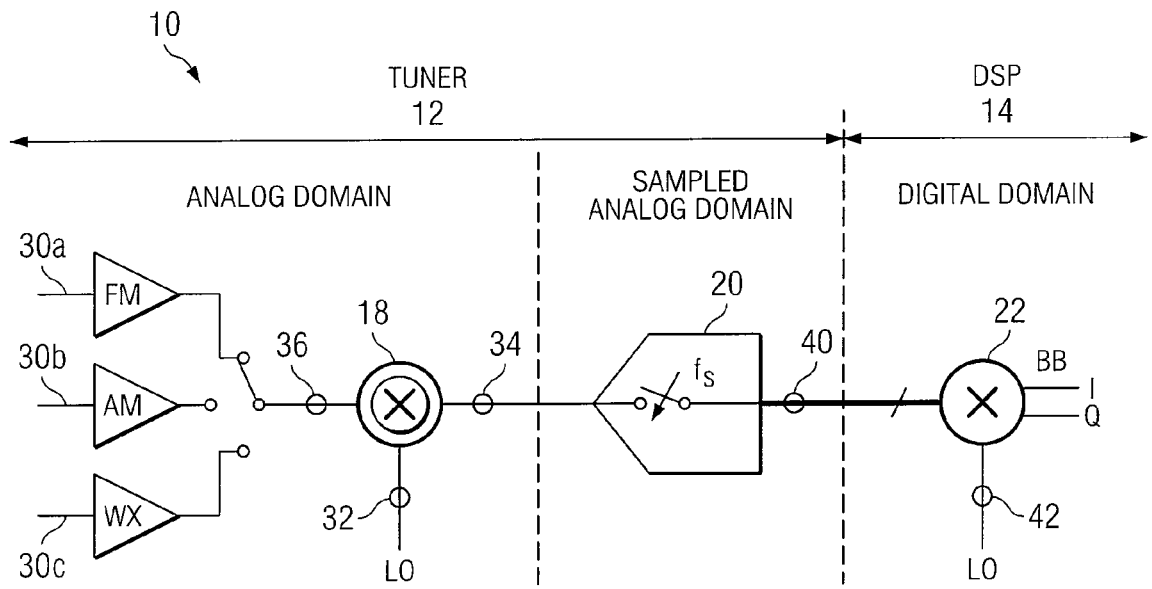
FIG. 1 illustrates a simplified block diagram of a digital radio system according to the present invention.
FIG. 3 illustrates several embodiments of frequency schemes that can be used in the system of FIG. 1.

FIG. 1 illustrates a simplified block diagram of a digital radio system 10 comprising a tuner block 12 and a digital signal processing (DSP) block 14. Tuner block 12 comprises a mixer 18 and an analog-to-digital converter (ADC) 20. DSP block 14 comprises a mixer 22. In general, the digitization performed by ADC 20 is performed using a bandpass sampling approach so that the subsequent baseband conversion performed by DSP block 14 can be performed on the digital signal without the need for complex frequency mixing. In this regard, an AM/FM/WX radio can be implemented using an "off the shelf" digital signal processing circuit.

A mixer comprises a circuit element that performs frequency translation of a broadband signal to an intermediate frequency (IF) signal, or from an IF signal to a baseband signal, or from a broadband signal to a baseband signal. For example, a mixer may comprise a bolometer, photoconductor, Schottky diode, quantum non-linear device (e.g. SIS receiver or Josephson junction mixer), variable gain amplifier, or any other suitable device that multiplies a first frequency signal with a local oscillator (LO) signal to generate a second frequency signal. Mixer 18 multiplies at least a portion of RF signal 30 with an LO signal 32 to generate an IF signal 34. In a particular embodiment, mixer 18 comprises an image rejection mixer that eliminates image noise from an unwanted sideband of IF signal 34.

RF signal 30 may comprise an FM signal 30a, an AM signal 30b, a WX signal 30c, or any other suitable radio frequency signal whether or not illustrated herein. An FM signal 30a generally comprises a radio frequency signal within the FM radio band that ranges from 65 to 108 MHz. Each FM signal 30a generally has up to a 200 kHz bandwidth that includes the center frequency and the upper and lower guard bands. In some embodiments, an FM signal 30a has up to a 400 kHz bandwidth in order to include high definition content. An AM signal 30b generally comprises a radio frequency signal within the AM radio band that ranges from 144 to 26100 kHz. Each AM signal 30b generally has up to a 10 kHz bandwidth. In some embodiments, an AM signal 30b has up to a 40 kHz bandwidth in order to include high definition content. A WX signal 30c generally comprises a radio frequency signal within the weather band that ranges from 162.400 MHz to 162.550 MHz. Each WX signal 30c generally has up to a 25 kHz bandwidth.

RF signal 30 includes a signal of interest 36 having an appropriate bandwidth depending on whether the signal 36 is within the FM, AM or WX band, as described above. Mixer 16 generates IF signal 34 based on signal 36 and an appropriate LO signal 32. Particular embodiments of system 10 are operated to generate IF signal 34 at a frequency of: (a) 10.7 MHz; (b) 12.0 MHz; or (c) 11.025 MHz, as described in greater detail below. These embodiments illustrate example frequencies, but it should be understood that any suitable frequency for IF signal 34 may be used. LO signal 32 is selected to frequency convert signal 36 to the selected frequency for IF signal 34.

ADC 20 comprises any suitable electronic circuit that converts an analog signal, such as IF signal 34, into a digital signal, such as digital signal 40. In general, the sampling frequency of ADC 20, $f_s$, is selected to be greater than twice the bandwidth of the signal of interest 36, and less than the frequency of IF signal 34. This bandpass sampling approach is based on folding signal 34 in a Nyquist Zone that is two or higher in order to generate a digital signal 40 that is well suited for subsequent digital signal processing, such as audio processing, channel coding, weak-signal processing, and so forth. In this regard, the bandpass sampling approach of system 10 is a departure from traditional sampling techniques that rely upon the Nyquist-Shannon theorem whereby the sampling frequency used to acquire a signal is at least twice the signal's highest frequency component. The bandpass sampling approach of system 10 takes advantage of the fact that the bandwidth of the signal of interest in an AM/FM/WX radio system is much smaller than the highest frequency component. In a particular embodiment, the sampling frequency of ADC 20 is selected according to the following formula:

$$f_s = f_{IF}/(((\text{Nyquist Zone}-1)/2)+\frac{1}{4}) \quad \text{(formula 1)}$$

wherein:
$f_s$=sampling frequency of ADC 20;
$f_{IF}$=frequency of IF signal 34; and
Nyquist Zone=any integer from 3 to 13.

Based on a sampling frequency selected according to formula 1 above, the frequency of digital signal 40 is given by the following formula:

$$f_{digital} = f_{IF} - (((\text{Nyquist Zone}-1)/2)*f_s) \quad \text{(formula 2)}$$

wherein:
$f_{digital}$=frequency of digital signal 40;
$f_{IF}$=frequency of IF signal 34; and
Nyquist Zone=any integer from 3 to 13.

As a result of this bandpass sampling approach, and the selection of a Nyquist Zone to equal any integer from three to thirteen in the formulas set forth above, the frequency of digital signal 40 equals one quarter of the sampling frequency of ADC 20. In this regard, digital signal 40 is presented to DSP block 14 in such a way that the subsequent baseband conversion can be realized without complex frequency mixing. In particular, mixer 22 of DSP block 14 can perform a baseband conversion of digital signal 40 by multiplying digital signal 40 with an LO signal 42 that is $f_s/4$. LO signal 42 can be generated using a cosine wave (e.g., 1, −1, −1, and 1; or 1, 0, −1, and 0 to generate the I signal) or a sin wave (e.g., 1, 1, −1, and −1; or 0, 1, 0, and −1 to generate the Q signal). By providing digital signal 40 in such a way as to allow mixer 22 to perform a simple multiplication involving only 1 or −1, system 10 reduces the computing power necessary in the DSP block 14. This results in power savings in system 10 and enables implementation of an AM/FM/WX radio using an "off the shelf" DSP block 14.

Although the previous description of ADC 20 is detailed with reference to digitizing an IF signal 34, it should be understood that the bandpass sampling approach set forth above can be implemented to digitize an RF signal 30 without departing from the scope of the present disclosure. This can be done by substituting the frequency of the RF signal 30 in the formulas 1 and 2 above where the frequency of the IF signal 34 was used.

The Nyquist Zones discussed above can be determined according to the sampling frequency, $f_s$. For example, Nyquist Zone 1 comprises frequencies between 0 and $f_s/2$. Nyquist Zone 2 comprises frequencies between $f_s/2$ and $f_s$. Nyquist Zone 3 comprises frequencies between $f_s$ and $3f_s/2$. The remaining Nyquist Zones 4-13 can be defined similarly.

Figure 2:
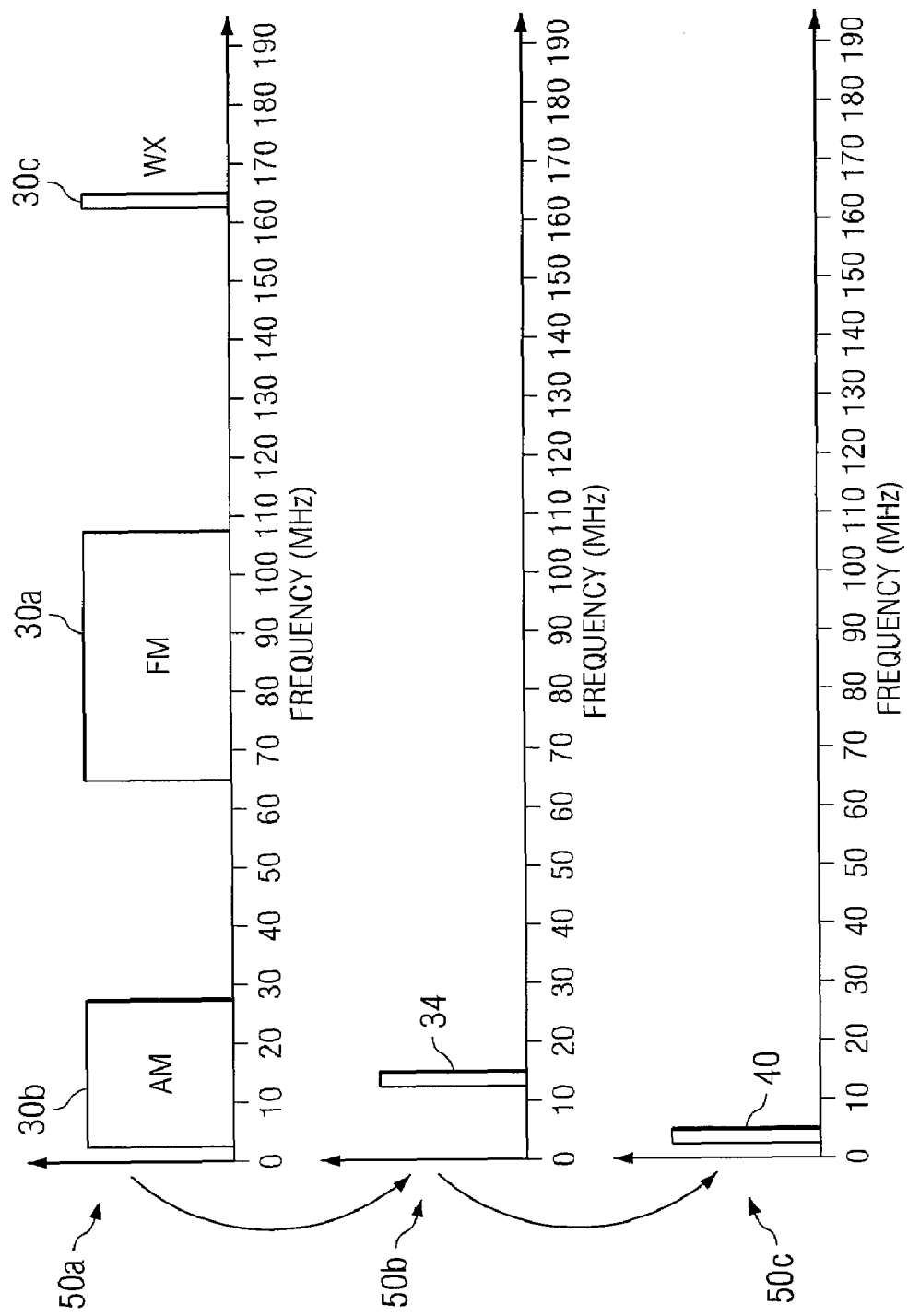
FIG. 2 illustrates a series of frequency graphs depicting the digitization of a radio frequency signal in the system of FIG. 1.

FIG. 2 illustrates a series of frequency graphs 50a, 50b, and 50c depicting the digitization of an RF signal 30 according to the present invention. In particular, one of RF signals 30a, 30b, 30c of graph 50a is frequency converted to IF signal 34 of graph 50b using mixer 18. As described above, signals 30a, 30b, and 30c represent an FM band, an AM band, and a weather band, respectively. As illustrated in FIG. 2, signals 30a (FM band) and 30c (WX band) are down-converted to IF signal 34. Signal 30b (AM band) may be up-converted or down-converted to IF signal 34 depending on the frequency of the particular signal of interest 36 within the AM band. In the illustrated embodiment, the frequency of IF signal 34 is 12.0 MHz. IF signal 34 of graph 50b is quantized to generate digital signal 40 using ADC 20 operating at the sampling frequency determined above, for example, using formula 1. In the illustrated embodiment, the sampling frequency of ADC 20 that is used is 1.920 MHz. Moreover, the frequency of the resulting digital signal 40 is 0.480 MHz, which equals $f_s/4$.

FIG. 3 illustrates frequency schemes 60a, 60b, and 60c that can be used in system 10. For example, frequency scheme 60a is based upon generating an IF signal 34 of 10.7 MHz; frequency scheme 60b is based upon using a 48 kHz audio sample rate; frequency scheme 60c is based upon using a 44.1 kHz audio sample rate. For each of these frequency schemes 60, the integer for the Nyquist Zone that is used in formulas 1 and 2 above has been selected to be thirteen. However, each of these frequency schemes 60 could also be formulated using any integer for the Nyquist Zone from three to thirteen. Each frequency scheme 60 includes an appropriate frequency for IF signal 34 in row 62a, sampling frequency of ADC 20 in row 62b, and frequency of digital signal 40 in row 62c. These frequencies are determined using the formulas 1 and 2 above. Using one of these frequency schemes 60a-c allows radio system 10 to use standard components for tuner block 12 and/or DSP block 14.

Figure 4:
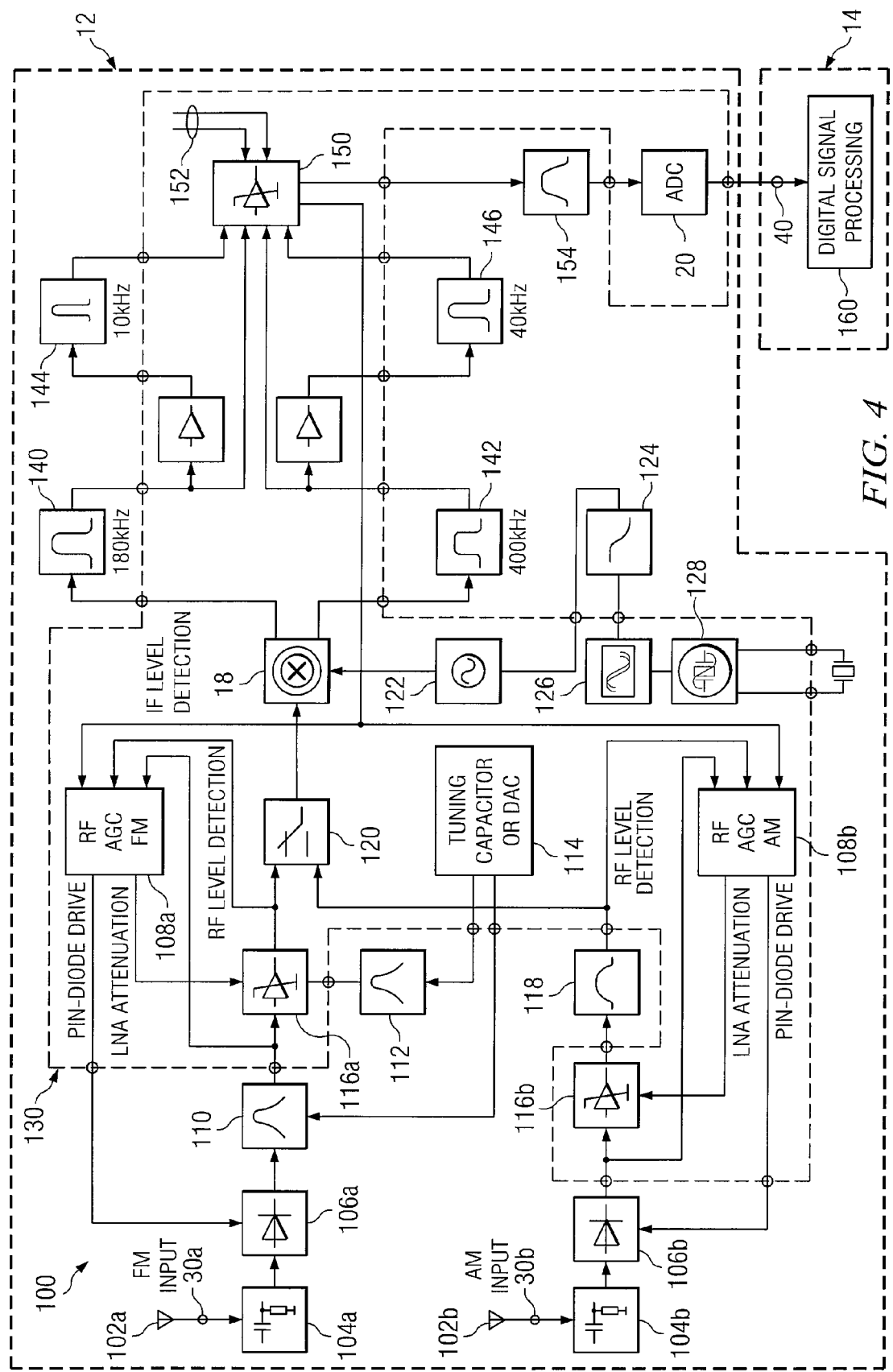
FIG. 4 illustrates a more detailed embodiment of a digital radio system according to the present invention.

FIG. 4 illustrates a more detailed embodiment of a digital radio system 100 having a tuner block 12 and a DSP block 14, according to the present invention. System 100 comprises antennas 102a and 102b to receive RF signals 30a and 30b. Impedance matching elements 104a and 104b match the different impedances of the antennas 102a and 102b to the low noise amplifiers 116a and 116b. Attenuators 106a and 106b attenuate the respective signals 30a and 30b provided by antennas 102a and 102b to avoid overloading the remainder of tuner block 12. In one embodiment, attenuators 106a and 106*b* comprise PIN-diodes that operate in conjunction with respective automatic gain control elements 108*a* and 108*b*.

A first tracking filter 110 and a second tracking filter 112 perform filtering on RF signal 30*a* in the FM band in order to provide the signal of interest 36. Thus, if an FM band signal 30*a* is 20 MHz wide, then tracking filters 110 and 112 facilitate providing a signal that is 2-4 MHz wide and that contains the signal of interest 36. Tracking filters 110 and 112 operate in response to signals received by a tuning capacitor 114. An LNA 116*a* amplifies signal of interest 36 in conjunction with the automatic gain control element 108*a* for provisioning to the image rejection mixer 18 through the bandswitch 120. Band filter 118 provides a signal of interest 36 from an RF signal 30*b* in the AM band. The bandswitch 120 allows the tuner block 12 of system 100 to be implemented using only one mixer 18 for use with both the FM band and the AM band. Mixer 18 generates IF signal 34, as described above with reference to FIGS. 1 and 2, in conjunction with the VCO 112, loop filter 124, fraction-n-PLL 126, and reference oscillator 128.

IF signal 34 may be processed by one or more channel filters 140, 142, 144, and 146 in order to provide steep selectivity and a narrow bandwidth around the signal of interest 36 prior to performing the analog-to-digital processing. The number and combination of channel filters 14-146 used in tuner block 12 is customizable and specific to a particular application. The IBOC channel filters 142 and 146 refer to an "in-band-on-channel" filter and is used for high definition radio applications. A variable gain amplifier 150 adjusts the filtered IF signal 34 to prepare it suitably for the subsequent analog-to-digital processing. Amplifier 150 operates in response to control signals 152. In one embodiment, a noise filter 154 is implemented prior to the ADC 20 in order to clean up IF signal 34 prior to digitization in order to resolve any noise folding problems that may arise due to the bandpass sampling approach implemented by ADC 20. ADC 20 digitizes IF signal 34 to create digital signal 40 according to the bandpass sampling approach described above. Digital signal processing element 160 comprises any suitable DSP chip or other circuitry designed to perform digital signal processing. In one embodiment, such a DSP chip may be a standard, "off the shelf" DSP chip.

Various elements of the tuner 12 are implemented on an integrated circuit that is illustrated using dashed lines 130. A particular novelty associated with system 100 is that mixer 18 and ADC 20 reside on the same integrated circuit. Moreover, unlike prior tuner blocks 12, tuning capacitor 114 also resides on the same integrated circuit as mixer 18 and ADC 20.

Although the present invention has been described in detail, it should be understood that various changes, substitutions and alterations can be made hereto without departing from the sphere and scope of the invention as defined by the appended claims.

What is claimed is:

1. A digital radio system, comprising:
  a first mixer operable to generate an intermediate frequency signal based at least in part upon a radio frequency signal and a local oscillator signal, wherein the intermediate frequency signal comprises a signal of interest having a particular bandwidth;
  an analog-to-digital converter communicatively coupled to the mixer and operable to generate a digital signal by quantizing the intermediate frequency signal using a sampling frequency that is greater than twice the bandwidth of the signal of interest and less than the frequency of the intermediate frequency signal; and
  a second mixer communicatively coupled to the analog-to-digital converter, the second mixer operable to receive the digital signal and generate a baseband signal based at least in part upon a multiplication of the digital signal using (a) an in-phase component, I, of [1, −1, −1, and 1] and quadrature component, Q, of [1, 1, −1, and −1]; or (b) an in-phase component, I, of [1, 0, −1, and 0] and quadrature component, Q, of [0, 1, 0, and −1].

2. The digital radio system of claim 1, wherein the digital signal is at a frequency that is one-quarter of the sampling frequency.

3. The digital radio system of claim 1, wherein the sampling frequency comprises the frequency of the intermediate frequency signal divided by three and one-quarter.

4. The digital radio system of claim 1, wherein the sampling frequency comprises the frequency of the intermediate frequency signal divided by four and one-quarter.

5. The digital radio system of claim 1, wherein the sampling frequency comprises the frequency of the intermediate frequency signal divided by five and one-quarter.

6. The digital radio system of claim 1, wherein the sampling frequency comprises the frequency of the intermediate frequency signal divided by six and one-quarter.

7. The digital radio system of claim 1, wherein the digital signal is at a frequency that is the frequency of the intermediate frequency signal minus three times the sampling frequency.

8. The digital radio system of claim 1, wherein the digital signal is at a frequency that is the frequency of the intermediate frequency signal minus four times the sampling frequency.

9. The digital radio system of claim 1, wherein the digital signal is at a frequency that is the frequency of the intermediate frequency signal minus five times the sampling frequency.

10. The digital radio system of claim 1, wherein the digital signal is at a frequency that is the frequency of the intermediate frequency signal minus six times the sampling frequency.

11. The digital radio system of claim 1, wherein the second mixer comprises a part of a digital signal processing circuit communicatively.

12. The digital radio system of claim 1, wherein the radio frequency signal comprises at least one of an AM signal, an FM signal, and a WX signal.

13. The digital radio system of claim 1, wherein the mixer and the analog-to-digital converter reside on the same integrated circuit chip.

14. The digital radio system of claim 1, wherein:
  the frequency of the intermediate frequency signal comprises 12.0 MHz;
  the sampling frequency comprises 1.920 MHz; and
  the frequency of the digital signal comprises 480 kHz.

15. The digital radio system of claim 1, wherein:
  the frequency of the intermediate frequency signal comprises 11.025 MHz;
  the sampling frequency comprises 1.764 MHz; and
  the frequency of the digital signal comprises 441 kHz.

16. The digital radio system of claim 1, wherein:
  the frequency of the intermediate frequency signal comprises 10.7 MHz;
  the sampling frequency comprises 1.712 MHz; and
  the frequency of the digital signal comprises 428 kHz.

17. A method for processing a frequency signal, comprising:
  generating an intermediate frequency signal based at least in part upon a radio frequency signal and a first local oscillator signal, wherein the intermediate frequency signal comprises a signal of interest having a particular bandwidth;
  generating a digital signal by quantizing the intermediate frequency signal using a sampling frequency that is greater than twice the bandwidth of the signal of interest and less than the frequency of the intermediate frequency signal;

generating a second local oscillator signal based at least in part upon (a) an in-phase component, I, of [1, −1, −1, and 1] and quadrature component, Q, of [1, 1, −1, and −1]; or (b) an in-phase component, I, of [1, 0, −1, and 0] and quadrature component, Q, of [0, 1, 0, and −1];

mixing the digital signal and the second local oscillator signal; and generating a baseband frequency signal in response to mixing the digital signal and the second local oscillator signal.

18. The method of claim 17, wherein the digital signal is at a frequency that is one-quarter of the sampling frequency.

19. The method of claim 17, wherein the sampling frequency comprises the frequency of the intermediate frequency signal divided by three and one-quarter.

20. The method of claim 17, wherein the sampling frequency comprises the frequency of the intermediate frequency signal divided by four and one-quarter.

21. The method of claim 17, wherein the sampling frequency comprises the frequency of the intermediate frequency signal divided by five and one-quarter.

22. The method of claim 17, wherein the sampling frequency comprises the frequency of the intermediate frequency signal divided by six and one-quarter.

23. The method of claim 17, wherein the digital signal is at a frequency that is the frequency of the intermediate frequency signal minus three times the sampling frequency.

24. The method of claim 17, wherein the digital signal is at a frequency that is the frequency of the intermediate frequency signal minus four times the sampling frequency.

25. The method of claim 17, wherein the digital signal is at a frequency that is the frequency of the intermediate frequency signal minus five times the sampling frequency.

26. The method of claim 17, wherein the digital signal is at a frequency that is the frequency of the intermediate frequency signal minus six times the sampling frequency.

27. The method of claim 17, wherein the radio frequency signal comprises at least one of an AM signal, an FM signal, and a WX signal.

28. The method of claim 17, wherein generating the intermediate frequency signal and generating the digital signal are performed by circuit elements that reside on the same integrated circuit chip.

29. The method of claim 17, wherein:
the frequency of the intermediate frequency signal comprises 12.0 MHz;
the sampling frequency comprises 1.920 MHz; and
the frequency of the digital signal comprises 480 kHz.

30. The method of claim 17, wherein:
the frequency of the intermediate frequency signal comprises 11.025 MHz;
the sampling frequency comprises 1.764 MHz; and
the frequency of the digital signal comprises 441 kHz.

31. The method of claim 17, wherein:
the frequency of the intermediate frequency signal comprises 10.7 MHz;
the sampling frequency comprises 1.712 MHz; and
the frequency of the digital signal comprises 428 kHz.

32. A method for processing a frequency signal, comprising:
receiving a radio frequency signal comprising a signal of interest having a particular bandwidth;
generating a digital signal by quantizing the radio frequency signal using a sampling frequency that is greater than twice the bandwidth of the signal of interest and less than the frequency of the radio frequency signal;
generating a local oscillator signal based at least in part upon (a) an in-phase component, I, of [1, −1, −1, and 1] and quadrature component, Q, of [1, 1, −1, and −1]; or (b) an in-phase component, I, of [1, 0, −1, and 0] and quadrature component, Q, of [0, 1, 0, and −1];
mixing the digital signal and the local oscillator signal; and
generating a baseband frequency signal in response to mixing the digital signal and the second local oscillator signal.

33. The method of claim 32, wherein the digital signal is at a frequency that is one-quarter of the sampling frequency.

34. The method of claim 32, wherein the sampling frequency comprises the frequency of the radio frequency signal divided by three and one-quarter.

35. The method of claim 32, wherein the sampling frequency comprises the frequency of the radio frequency signal divided by four and one-quarter.

36. The method of claim 32, wherein the sampling frequency comprises the frequency of the radio frequency signal divided by five and one-quarter.

37. The method of claim 32, wherein the sampling frequency comprises the frequency of the radio frequency signal divided by six and one-quarter.

38. The method of claim 32, wherein the digital signal is at a frequency that is the frequency of the radio frequency signal minus three times the sampling frequency.

39. The method of claim 32, wherein the digital signal is at a frequency that is the frequency of the radio frequency signal minus four times the sampling frequency.

40. The method of claim 32, wherein the digital signal is at a frequency that is the frequency of the radio frequency signal minus five times the sampling frequency.

41. The method of claim 32, wherein the digital signal is at a frequency that is the frequency of the radio frequency signal minus six times the sampling frequency.

42. The method of claim 32, wherein the radio frequency signal comprises at least one of an AM signal, an FM signal, and a WX signal.

* * * * *